United States Patent
Lee et al.

(10) Patent No.: US 11,169,697 B2
(45) Date of Patent: Nov. 9, 2021

(54) ELECTRONIC DEVICE AND METHOD FOR DISPLAYING CONTEXTUAL INFORMATION OF APPLICATION

(71) Applicant: Samsung Electronics Co., Ltd., Gyeonggi-do (KR)

(72) Inventors: Hyeonseung Lee, Gyeonggi-do (KR); Juyoung Kim, Gyeonggi-do (KR); Hyeyoung Moon, Gyeonggi-do (KR); Yuna Choi, Gyeonggi-do (KR); Sungchan Bae, Gyeonggi-do (KR); Minwook Na, Gyeonggi-do (KR); Yunsung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/749,045

(22) Filed: Jan. 22, 2020

(65) Prior Publication Data
US 2020/0241740 A1    Jul. 30, 2020

(30) Foreign Application Priority Data
Jan. 28, 2019    (KR) .......................... 10-2019-0010719

(51) Int. Cl.
*G06F 3/0482* (2013.01)
*G06F 3/0481* (2013.01)
(Continued)

(52) U.S. Cl.
CPC ........ *G06F 3/04883* (2013.01); *G06F 3/0482* (2013.01); *G06F 3/04817* (2013.01); *G06F 3/04845* (2013.01)

(58) Field of Classification Search
None
See application file for complete search history.

(56) References Cited

U.S. PATENT DOCUMENTS 6,108,003 A * 8/2000 Hall, Jr. ............... G06F 3/0481
715/772
7,343,567 B2 * 3/2008 Mann .................. G06F 3/0481
715/811
(Continued)

FOREIGN PATENT DOCUMENTS

CN    106775379 A  *  5/2017
KR    20120108589 A  *  10/2012
(Continued)

OTHER PUBLICATIONS

Griffiths et al. Head First Android Development, 2nd Edition. Publisher: O'Reilly Media, Inc. Release Date: Aug. 2017. ISBN: 9781491974056. Electronic edition accessed at [https://learning.oreilly.com/library/view/head-first-android/9781491974049] on [Nov. 27, 2020], Chapters 1, 6, and 12. 168 pages (Year: 2017).*

(Continued)

*Primary Examiner* — Amy M Levy
(74) *Attorney, Agent, or Firm* — Cha & Reiter, LLC

(57) ABSTRACT

An electronic device and method are disclosed herein. The electronic device includes a touchscreen, at least one processor, and a memory. The processor implements the method, including: execute an application in response to receiving a first input, identify whether a display type of an application bar associated with the executed application is a first type or a second type, the first type capable of displaying information related to an application, and the second type capable of displaying a representation of the application, based on the display type of the application bar being the first type, obtain contextual information associated with the application, and after obtaining the contextual information, display the application bar on the touchscreen, the application bar including first display information based on the obtained contextual information.

19 Claims, 13 Drawing Sheets

(51) Int. Cl.
*G06F 3/0488* (2013.01)
*G06F 3/0484* (2013.01)

(56) References Cited

U.S. PATENT DOCUMENTS

| | | | | |
|---|---|---|---|---|
| 7,747,966 B2* | 6/2010 | Leukart | ................ | G06Q 10/109 |
| | | | | 715/792 |
| 10,083,205 B2* | 9/2018 | Shapira | ................. | G06F 16/338 |
| 10,198,176 B2* | 2/2019 | Lee | ...................... | G06F 3/04883 |
| 2005/0050462 A1* | 3/2005 | Whittle | ................. | G06F 3/0481 |
| | | | | 715/247 |
| 2011/0265028 A1* | 10/2011 | Hong | .................... | H04M 1/724 |
| | | | | 715/779 |
| 2014/0237378 A1* | 8/2014 | Gonen | ................ | G06F 3/04817 |
| | | | | 715/745 |
| 2014/0365963 A1* | 12/2014 | Garty | ................ | G06F 3/04847 |
| | | | | 715/810 |
| 2015/0067557 A1 | 3/2015 | Lee et al. | | |
| 2015/0067585 A1 | 3/2015 | Won et al. | | |
| 2015/0186610 A1* | 7/2015 | Sansale | ............... | G06F 3/04842 |
| | | | | 715/736 |
| 2016/0266742 A1* | 9/2016 | Hussain | .............. | G06F 3/04842 |
| 2016/0306511 A1* | 10/2016 | Park | .................... | G06F 3/04842 |
| 2017/0123637 A1* | 5/2017 | Hirakawa | ............. | G06F 3/0482 |
| 2018/0059881 A1* | 3/2018 | Agboatwalla | ........... | F25D 29/00 |
| 2018/0095611 A1* | 4/2018 | Kuscher | .............. | G06F 3/04847 |
| 2018/0164963 A1* | 6/2018 | Ku | ......................... | G06F 3/0483 |
| 2018/0225023 A1* | 8/2018 | Li | ........................... | H04L 51/18 |
| 2019/0220507 A1* | 7/2019 | Foss | .................... | G06F 3/04883 |
| 2019/0258371 A1* | 8/2019 | Huang | .................... | G06F 16/00 |
| 2020/0012423 A1* | 1/2020 | Cinek | ................. | G06F 3/04886 |

FOREIGN PATENT DOCUMENTS

| KR | 20160050571 A | * | 5/2016 |
|---|---|---|---|
| KR | 10-2018-0024288 A | | 3/2018 |

OTHER PUBLICATIONS

Echessa, Joyce (Better User Interfaces with the Android Action Bar. Blog entry posted 04/02/204 at sitepoint.com. Retrieved from [https://www.sitepoint.com/better-user-interfaces-android-action-bar/] on [Nov. 19, 2020], 38 pages (Year: 2014).*

Stackoverflow. Android Collapsing ToolbarLayout collapse Listener. Archived on Nov. 21, 2016. Retrieved via Internet Archive from [https://stackoverflow.com/questions/31682310/android-collapsingtoolbarlayout-collapse-listener] on [Mar. 25, 2021]. 4 pages. (Year: 2016).*

Stackoverflow. Android Collapsing ToolbarLayout collapse Listener. Question and all responses as of retrieval date. Retrieved via [https://stackoverflow.com/questions/31682310/android-collapsingtoolbarlayout-collapse-listener] on [Mar. 25, 2021]. 9 pages. (Year: 2020).*

App bars: top—Material Design; https://material.io/components/app-bars-top/; 17 pages.

* cited by examiner

ELECTRONIC DEVICE AND METHOD FOR DISPLAYING CONTEXTUAL INFORMATION OF APPLICATION

CROSS-REFERENCE TO RELATED APPLICATION(S)

This application is based on and claims priority under 35 U.S.C. 119 to Korean Patent Application No. 10-2019-0010719, filed on Jan. 28, 2019, in the Korean Intellectual Property Office, the disclosure of which is herein incorporated by reference in its entirety.

TECHNICAL FIELD

Certain embodiments relate to an electronic apparatus and a method for displaying contextual information of an application.

BACKGROUND

With an increase in the computing performance of electronic devices, the variety of services and functions providable by the electronic devices has grown. In order to increase the effectiveness and usefulness of electronic devices and continue to meet consumer demands, various applications have been developed for execution in the electronic devices. As a result, nowadays, dozens to hundreds of applications can be downloaded and operated a mobile electronic devices. These mobile devices typically include a display (e.g. a touchscreen), and commonly take the form of smartphones, mobile phones, notebook computers, and tablet PCs.

The electronic device can display, on the display, application icons selectable to execute corresponding applications. A user may command execution of a desired application by selecting a corresponding icon from among the displayed application icons.

SUMMARY

When an application is executed, an electronic device may display interactable screens on a display in order to perform various services provided by the executed application. Further, the electronic device may display an application bar in a specific region (e.g. an uppermost region) of the display. For example, the application bar may display a title predetermined before the execution of an application.

Certain embodiments may provide a method capable of intuitively and conveniently providing more various types of information on an application screen to an application bar on the basis of the situation of an electronic device or a user's intention.

According to certain embodiments, an electronic device includes: a touchscreen; at least one processor; and a memory, wherein the memory may store instructions executable by the at least one processor to cause the electronic device to execute an application in response to receiving a first input, identify whether a display type of an application bar associated with the executed application is a first type or a second type, the first type capable of displaying information related to an application, and the second type capable of displaying a representation of the application, based on the display type of the application bar being the first type, obtain contextual information associated with the application, and after obtaining the contextual information, display the application bar on the touchscreen, the application bar including first display information based on the obtained contextual information.

According to certain embodiments, an operation method of the electronic device may include: executing, by at least one processor, an application in response to a first input, identifying whether a display type of an application bar associated with the application is a first type or a second type, the first type capable of displaying information related to an application, and the second type capable of displaying a representation of the application, based on the display type of the application bar being the first type, obtaining contextual information associated with the application, and after obtaining the contextual information, displaying the application bar on a touchscreen, the application bar including first display information based on the obtained contextual information.

According to certain embodiments, in a recording medium configured to store instructions, the instructions are configured to enable at least one circuit to perform at least one operation when the instructions are executed by the at least one circuit, wherein the at least one operation may include: executing, by at least one processor, an application in response to a first input, identifying whether a display type of an application bar associated with the application is a first type or a second type, the first type capable of displaying information related to an application, and the second type capable of displaying a representation of the application, based on the display type of the application bar being the first type, obtaining contextual information associated with the application, and after obtaining the contextual information, displaying the application bar on a touchscreen, the application bar including first display information based on the obtained contextual information.

The method and the electronic device according to certain embodiments can intuitively and conveniently provide more various types of information regarding a present screen on the basis of a situation of the electronic device or a user's intention, and thereby enable the user to quickly and efficiently determine the information.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
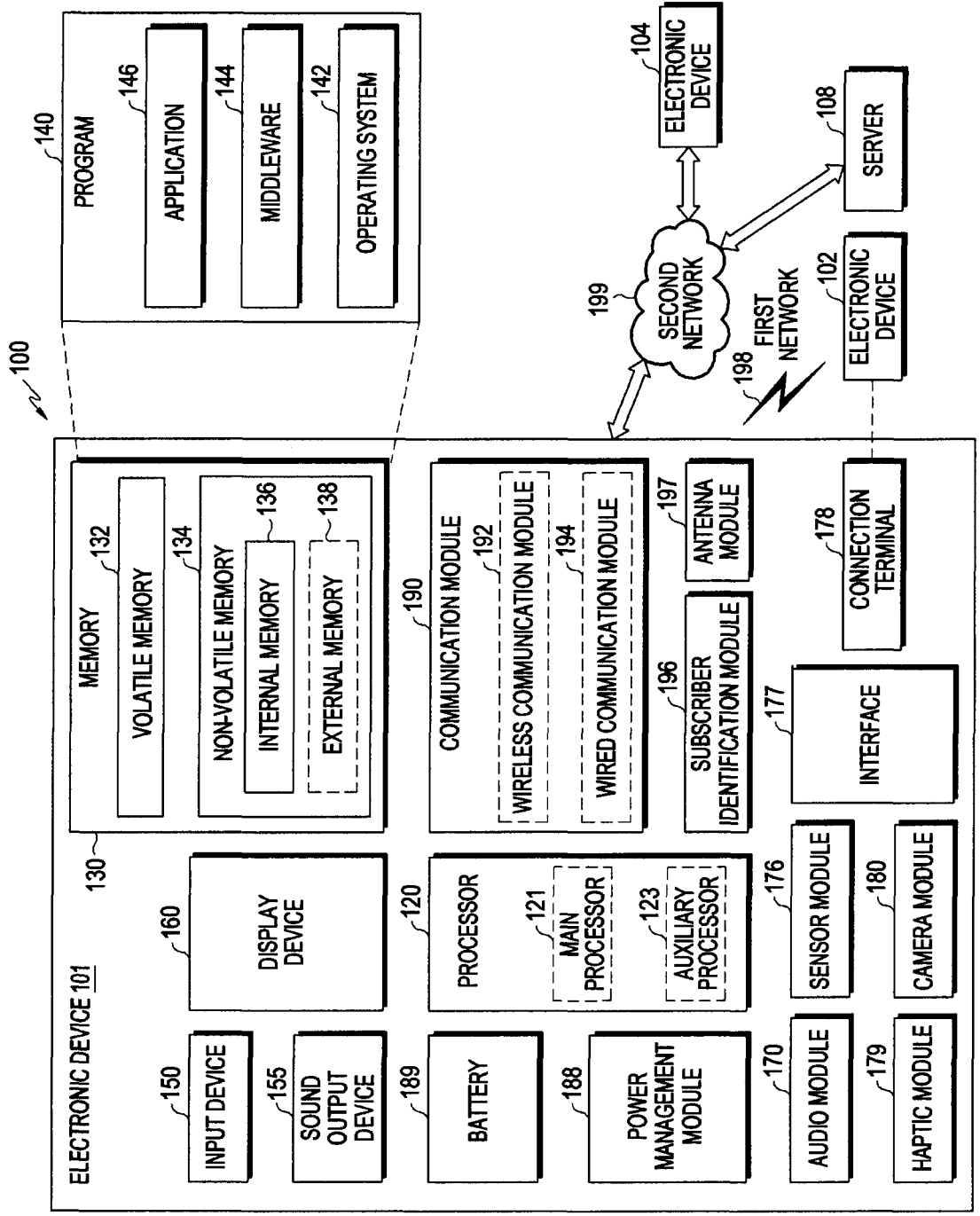
FIG. 1 is a block diagram of an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or recording, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
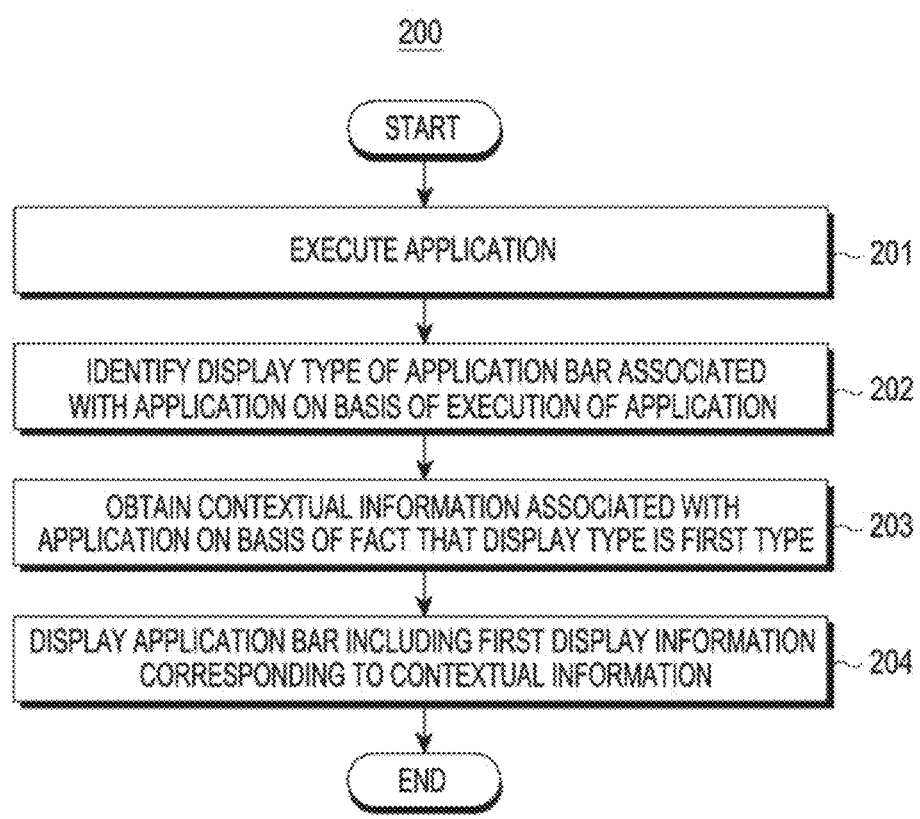
FIG. 2 is a flowchart for describing an operation of an electronic device according to certain embodiments.

FIG. 2 is a flowchart 200 for describing an operation of an electronic device according to certain embodiments.

According to certain embodiments, operation 201 to operation 204 may be performed through the electronic device 101 or the processor 120 in FIG. 1. The electronic device 101 may store instructions to execute operation 201 to operation 204 in a memory (e.g. the memory 130 in FIG. 1). According to one embodiment, at least one among operation 201 to operation 204 may be omitted, the sequence of some operations may be changed, or another operation may be added.

In operation 201, the electronic device 101 may execute an application. For example, the electronic device 101 may display at least one icon associated with the execution of an application on a touchscreen (e.g. the display device 160 in FIG. 1). The electronic device 101 may acquire/receive a user's selection regarding the at least one icon displayed on the touchscreen 160. In one embodiment, the electronic device 101 may identify whether the user selects the at least one icon by acquiring/detecting the user's touch input on the touchscreen 160. When the user's selection of the at least one icon is identified, the electronic device 101 may execute an application corresponding to the icon selected by the user.

In operation 202, the electronic device 101 may identify a display type of an application bar associated with the application on the basis of the execution of the application. For example, the electronic device 101 may display a user interface of the application on the basis of the execution of the application. According to one embodiment, an application bar for representing the executed application may be included in a specific region of the user interface of the application. For example, the application bar may be disposed in an upper region of the user interface of the application so as to display title information indicating the title or an operation of the application. According to certain embodiments, the electronic device 101 may identify the display type of an application bar to be displayed in a user interface of an application. According to certain embodiments, the display type of an application bar may be divided into a first type capable of displaying representation information of an application and/or additional information which is more useful and related to a user in relation to the application, and a second type capable of displaying basic information for representing the application (e.g., but unable to display any further additional information beyond the basic representative information).

In operation 203, the electronic device 101 may obtain contextual information associated with the application based on the display type of the application bar being determined to be a first type, and capable of displaying additional information pertinent the application beyond basic representations. For example, the contextual information associated with the application may include at least one of application identification information, application configuration information, or application event information obtained from the executed application, or electronic device system information obtained from a system of the electronic device 101. For example, the application identification information may be identification information used to identify the application or may be title information indicating the application or an operation of the application. The application configuration information may be user configuration information related to a function of the application. The application state information may be state information related to a function of the application. The application event information may be information regarding an event occurring in relation to a function of the application. Further, the electronic device system information may be current time, date, location information, or network connection information.

In operation 204, the electronic device 101 may display the "application bar" including first display information corresponding to the contextual information on the touchscreen on the basis of the contextual information. For example, the first display information may include application representation information and/or additional information which is more useful and related to a user in relation to the application. In one example, in relation to an alarm application, first display information may include information, such as the remaining time to an alarm closest to the current time, the number of configured alarms, and the number of the activated or deactivated alarms among configured alarms. In another example, in the case of a world clock application, first display information may include information, such as the time of a country (or a city) in which a user stays, and the time difference between the user's own country (or the user's residence city) and a country (or a city) in which the user stays. In another example, in the case of an application (e.g. mail, messenger, contacts, or phone call (call list)) related to receiving an event from the outside, first display information may include, for example, summary information of a message (e.g. mail, SMS, MMS, or chatting) related to a specific user configured by a user and information on whether an event is received. In another example, in the case of an application (e.g. a file management application or a gallery application) related to a memory of an electronic device, first display information may include summary information regarding a latest updated file.

According to certain embodiments, the electronic device 101 may generate first display information associated with an application on the obtained contextual information and may display the generated first display information on an application bar. For example, the electronic device 101 may provide/generate first display information on the basis of at least one of contextual information obtained from an application or contextual information obtained from the system of the electronic device. For example, the electronic device 101 may provide/generate first display information on the basis of at least one of: application state information (e.g. title information indicating an application or an operation of the application); application identification information (e.g. identification information used to identify the application); application configuration information (e.g. user configuration information related to a function of the application); application state information (e.g. state information related to a function of the application); application event information (e.g. information regarding an event occurring in relation to a function of the application); or electronic device system information (e.g. current time, date, location information or network connection information). According to one embodiment, the electronic device 101 may provide/generate first display information on the basis of the user configuration information related to a function of an application and the electronic device system information. For example, if an executed application is an alarm application, the electronic device 101 may compare an alarm time configured by a user with the current time to provide/generate, as first display information, information such as the remaining time to an alarm closest to the current time. Alternately, the electronic device 101 may provide/generate first display information on the basis of user configuration information related to a function of the application, information regarding an event occurring in relation to a function of the application, and electronic device system information. For example, if an executed application is an e-mail application, the electronic device 101 may provide/generate, as first display information, summary information regarding an e-mail message received in relation to a specific user configured by a user. Alternately, electronic device 101 may provide/generate first display information on the basis of application state information and electronic device system information. For example, if an executed application is a file management application, the electronic device 101 may provide/generate, as first display information, summary information regarding a file lastly stored or updated in the memory of the electronic device.

Figure 3:
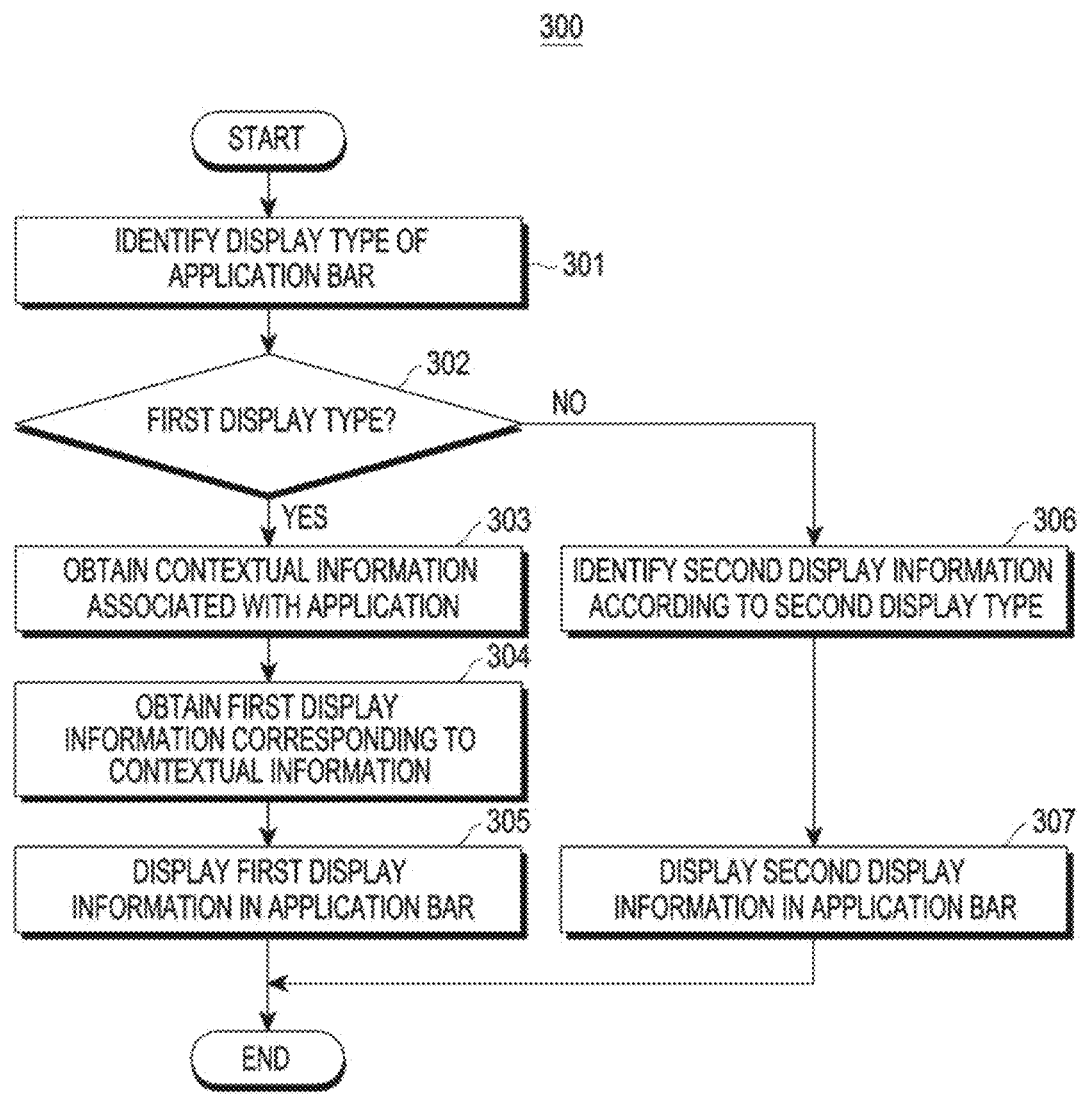
FIG. 3 is a flowchart for describing an operation of an electronic device according to certain embodiments.

FIG. 3 is a flowchart 300 for describing an operation of an electronic device according to certain embodiments.

According to certain embodiments, operation 301 to operation 307 may be performed through the electronic device 101 and the processor 120 in FIG. 1. The electronic device 101 may store instructions to execute operation 301 to operation 307 in a memory (e.g. the memory 130 in FIG. 1). According to one embodiment, at least one among operation 301 to operation 307 may be omitted, the sequence of some operations may be changed, or another operation may be added.

In operation 301, the electronic device 101 may identify a display type of an application bar associated with an application. For example, the electronic device 101 may display a user interface of the application on the basis of the execution of the application. An application bar for representing the executed application may be included in a specific region of the user interface. The electronic device 101 may identify a display type of the application bar. According to certain embodiments, the display type of an application bar may be divided into a first type capable of displaying representation information of an application and/or additional information which is more useful and related to a user in relation to the application and a second type capable of displaying basic information for representing the application. For example, the electronic device 101 may identify whether the display type of an application bar is a first type or a second type on the basis of a user configuration for the application bar.

In operation 302, the electronic device 101 may identify whether the identified display type of the application bar is the first type among the first type or the second type. In the first type of the application bar, contextual information associated with the application may be obtained and first display information corresponding to the obtained contextual information may be displayed. In the second type of the application bar, second display information preconfigured before the execution of an application may be included and displayed without respect to the contextual information associated with the application. Further, the first-type application bar may include an enlarged region larger than a region of the second-type application bar. The electronic device 101 may perform operation 303 when the display type of the application is identified to be the first type and may perform operation 306 when the display type of the application is identified to be the second type.

In operation 303, the electronic device 101 may obtain contextual information associated with the application on the basis of the display type of the application bar being the first type. For example, the contextual information associated with the application may include at least one of application identification information, application configuration information, or application event information obtained from an executed application, or electronic device system information obtained from a system of the electronic device 101.

In operation 304, the electronic device 101 may generate first display information associated with the application on the basis of the obtained contextual information. For example, the electronic device 101 may provide/generate first display information on the basis of at least one of contextual information obtained from the application or contextual information obtained from the system of the electronic device.

In operation 305, the electronic device 101 may display an application bar including the first display information generated on the touchscreen. For example, the first display information included in the application bar may include representation information of the application and/or additional information which is more useful and related to a user in relation to the application. According to one embodiment, the electronic device 101 may enlarge a region of the application bar on the basis of the generated first display information.

In operation 306, the electronic device 101 may identify the second display information configured before the execution of the application on the basis of the display type of the application bar being the second type. For example, the second display information may indicate basic information for representing the application. For example, the second display information may be title information indicating the application or an operation of the application.

In operation 307, the electronic device 101 may display an application bar including the identified second display information on the touchscreen. For example, the application bar including the second display information may include a reduced region, compared with the application bar including the first display information.

Figure 4:
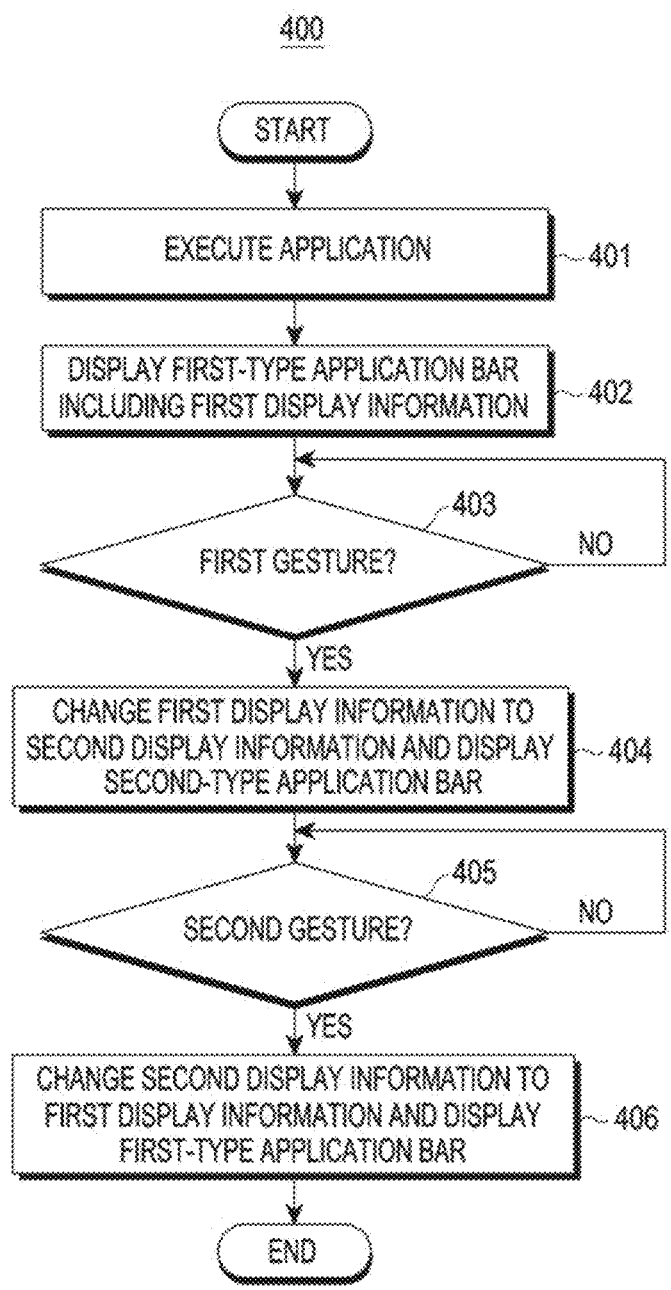
FIG. 4 is flowchart for describing an operation of an electronic device according to certain embodiments.

FIG. 4 is flowchart 400 for describing an operation of an electronic device according to certain embodiments.

According to certain embodiments, operation 401 to operation 406 may be performed through the electronic device 101 or the processor 120 in FIG. 1. The electronic device 101 may store instructions to execute operation 401 to operation 406 in a memory (e.g. the memory 130 in FIG. 1). According to one embodiment, at least one among operation 401 to operation 406 may be omitted, the sequence of some operations may be changed, or another operation may be added.

In operation 401, the electronic device 101 may execute an application. For example, the electronic device 101 may display at least one icon associated with the execution of an application on a touchscreen (e.g. the display device 160 in FIG. 1), and, when a user's selection of the at least one icon is determined, may execute an application corresponding to the icon selected by the user.

In operation 402, the electronic device 101 may display an application bar including first display information on the touchscreen 160 in response to the execution of the application. On the basis of the execution of the application, the electronic device 101 may identify the display type of the application bar. When the display type of the application bar is identified to be a first type, the electronic device 101 may display the application bar including the first display information in a user interface of the application. The electronic device 101 may display, based on the first display information, a region of the application bar in an enlarged or reduced size.

In operation 403, in the state in which the application bar including the first display information is displayed on the touchscreen 160, the electronic device 101 may identify whether a first gesture for the user interface or the application bar is detected/received. For example, the first gesture for the application may include a touch drag or touch flick gesture scrolled toward the region of the application bar in a user interface of the application. When it is identified that the first gesture is detected/received, the electronic device 101 may perform operation 404. When it is identified that the first gesture is not detected/received, the electronic device 101 may periodically perform operation 403, may not perform a separate operation, or may perform a normal operation of the electronic device 101.

In operation 404, the electronic device 101 may reduce and display a region of the application bar in response to the first gesture for the application bar. For example, the electronic device 101 may change the display type of the application bar from the first type to a second type. The electronic device 101 may change the first display information displayed in the application bar to second display information and may display the second display information. For example, the first display information may include representation information of an application and/or additional information which is more useful and related to a user in relation to the application. The second display information may include title information indicating an application or an operation of the application, such that the title information plays a role of representing the application. That is, the region of an application bar including the first display information may be relatively wider than that of an application bar including the second display information, and as the first display information is changed to the second display information, the region of the application bar may be reduced and displayed.

In operation 405, in the state in which the application bar including the second display information is displayed on the touchscreen 160, the electronic device 101 may identify whether a second gesture for the user interface or application bar is detected/received. For example, the second gesture for the application bar may include a touch drag or touch flick gesture scrolled in the opposite direction to the region of the application bar in the user interface of the application. When it is identified that the second gesture is detected/received, the electronic device 101 may perform operation 406. When it is identified that the second gesture is not detected/received, the electronic device 101 may not perform a separate operation, or may perform a normal operation of the electronic device 101.

In operation 406, the electronic device 101 may enlarge and display the region of the application bar in response to the second gesture for the application bar. For example, the electronic device 101 may change the display type of the application bar from the second type to the first type. Further, the electronic device 101 may change the second display information displayed on the application bar to the first display information. The region of an application bar including the second display information may be relatively smaller than that of an application bar including the first display information, and as the second display information is changed to the first display information, the region of the application bar may be enlarged and displayed.

Figures 5A, 5B:
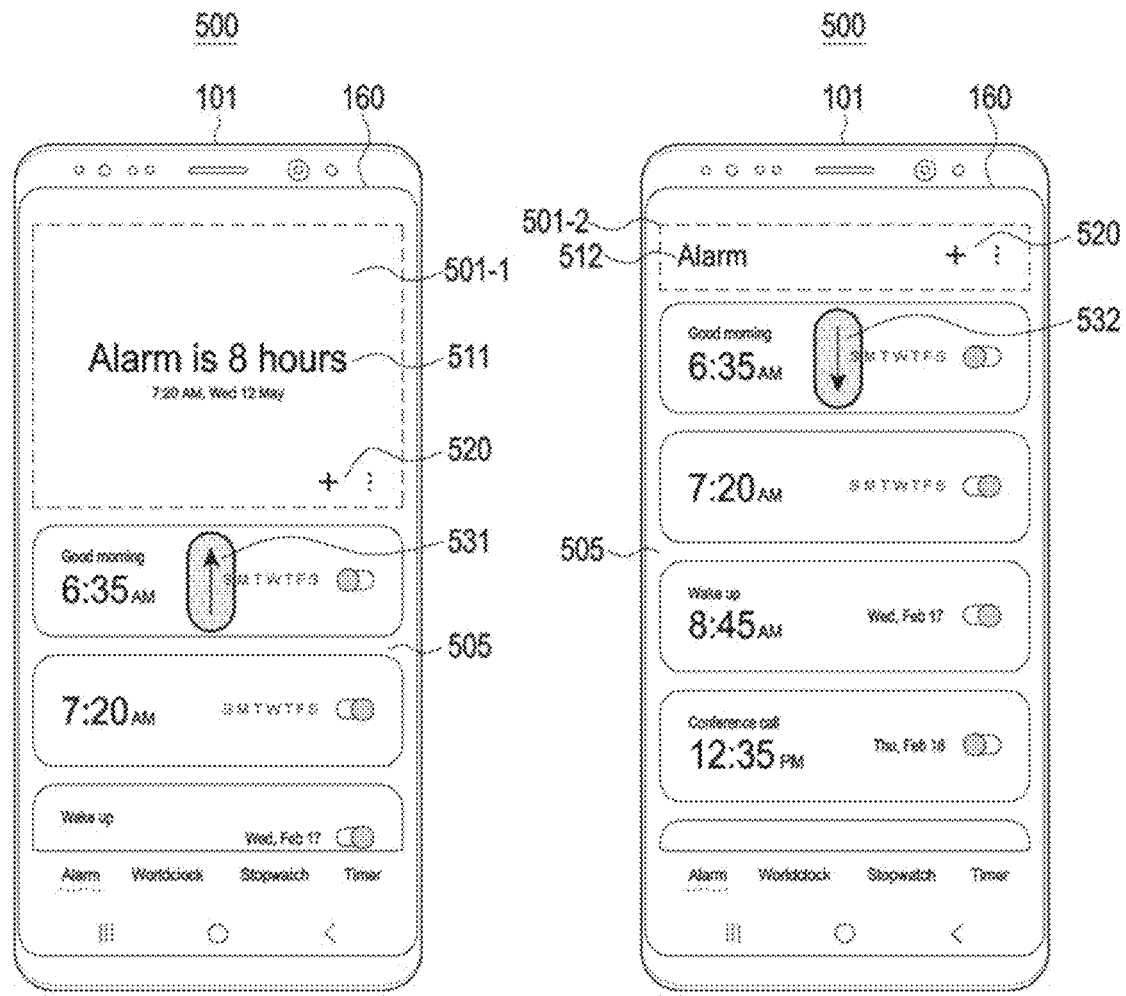
FIG. 5A illustrates an example for describing a user interface including an application bar according to certain embodiments.
FIG. 5B illustrates an example for describing a user interface including an application bar according to certain embodiments.

FIG. 5A illustrates an example 500 for describing a user interface including an application bar according to certain embodiments, and FIG. 5B illustrates an example 500 for describing a user interface including an application bar according to certain embodiments.

Referring to FIGS. 5A and 5B, the electronic device 101 may display a user interface 505 of an application on the touchscreen 160, and an application bar 501-1 or 501-2 for representing an application that may be included in the specific region of the user interface 505. For example, FIGS. 5A and 5B illustrate the user interface 505 of an alarm application. FIG. 5A illustrates an example in which a first-type application bar 501-1 is displayed in the user interface 505 of the application, and FIG. 5B illustrates an example in which a second-type application bar 501-2 is displayed in the user interface 505 of the application.

When the display type of the user interface 505 of the alarm application is identified to be a first type, the electronic device 101 may acquire, as contextual information associated with the alarm application, alarm configuration information configured by a user from the alarm application, and may obtain current time information from the system of the electronic device 101. The electronic device 101 may compare the obtained current time with the obtained alarm time configured by the user and may generate, as first display information, information such as the remaining time to an alarm closest to the current time.

As illustrated in FIG. 5A, the electronic device 101 may display the first-type application bar 501-1 in the upper region of the user interface 505, and may display, on the application bar 501-1, first display information 511 generated based on the contextual information associated with the alarm application. For example, the first display information associated with the alarm application may include information such as the remaining time duration before a next alarm scheduled to activate closest to the current time. Further, the application bar 501-1 may include an action icon 520 associated with a basic function of the alarm application (e.g., creating a new alarm).

The electronic device 101 may identify whether a first gesture 531 for the application bar 501-1 is detected/received from the user interface 505 illustrated in FIG. 5A. For example, the first gesture 531 may include a touch drag or touch flick gesture moved towards the region of the application bar 501-1 in the user interface 505.

In response to the first gesture 531 for the first-type application bar 501-1, the electronic device 101 may display, as illustrated in FIG. 5B, the second-type application bar 501-2 in the upper region of the user interface 505 in place of the first-type application bar 501-1. Second display information 512 may be displayed in the second-type application bar 501-2. For example, application title information may be displayed as the second display information associated with the alarm application.

The electronic device 101 may identify whether a second gesture 532 for the application bar 501-2 is detected/received from the user interface 505 illustrated in FIG. 5B. For example, the second gesture 532 may include a touch drag or touch flick gesture scrolled in the opposite direction to the region of the application bar 501-2 in the user interface 505.

In response to the second gesture 532 for the second-type application bar 501-2, the electronic device 101 may redisplay, as illustrated in FIG. 5A, the first-type application bar 501-1 in the upper region of the user interface 505 in place of the second-type application bar 501-2.

Figure 6A:
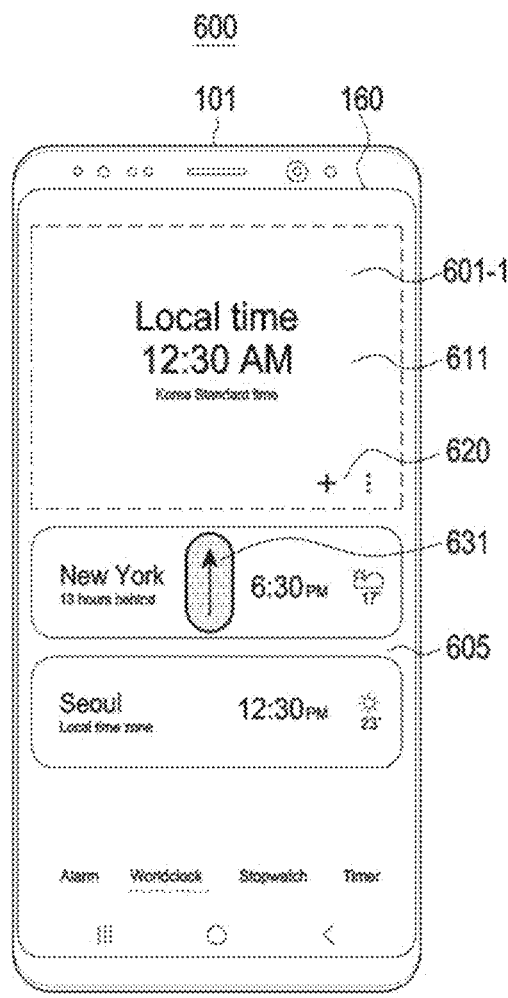
FIG. 6A illustrates an example for describing a user interface including an application bar according to certain embodiments.
Figure 6B:
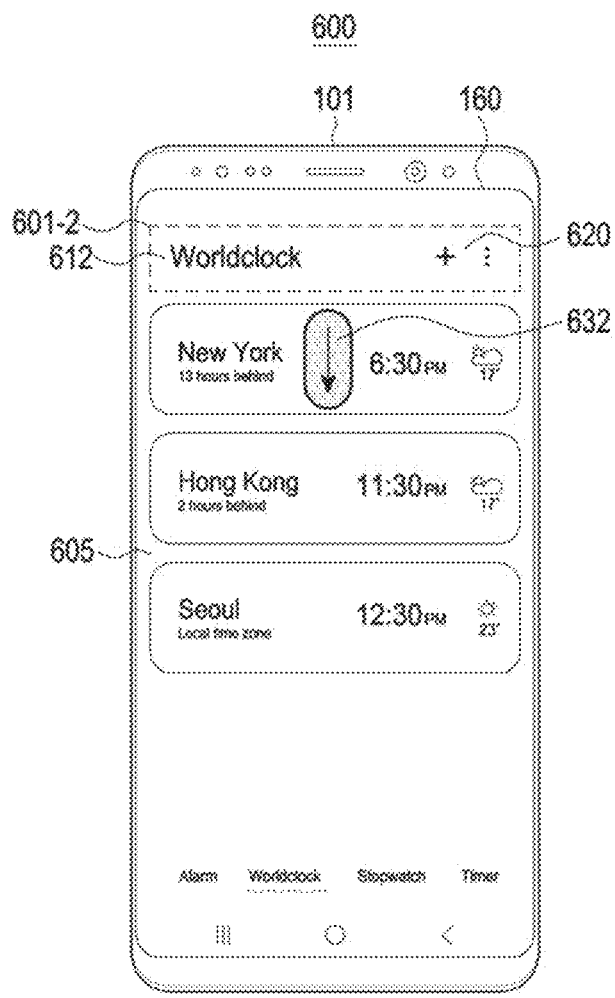
FIG. 6B illustrates an example for describing a user interface including an application bar according to certain embodiments.

FIG. 6A illustrates an example 600 for describing a user interface including an application bar according to certain embodiments, and FIG. 6B illustrates an example 600 for describing a user interface including an application bar according to certain embodiments.

Referring to FIGS. 6A and 6B, the electronic device 101 may display a user interface 605 of an application on the touchscreen 160, and an application bar 601-1 or 601-2 for representing an application may be included in the specific region of the user interface 605. FIGS. 6A and 6B illustrate the user interface 605 of a world time application. FIG. 6A illustrates an example in which a first-type application bar 601-1 is displayed in the user interface 605 of the application, and FIG. 6B illustrates an example in which a second-type application bar 601-2 is displayed in the user interface 605 of the application.

When the display type of the user interface 605 of the world time application is identified to be a first type, the electronic device 101 may acquire, as contextual information associated with the world time application, local information configured by a user from the world time application and may obtain current time information and current position information from the system of the electronic device 101. The electronic device 101 may compare the obtained local information configured by the user with the obtained current time information and current position information and may provide/generate, as first display information, information such as the time of a country (or a city) in which the user stays, and the time difference between the user's own country (or the user's residence city) and a country (or a city) in which the user stays.

As illustrated in FIG. 6A, the electronic device 101 may display the first-type application bar 601-1 in the upper region of the user interface 605, and may display, on the application bar 601-1, first display information 611 generated based on the contextual information associated with the world time application. For example, the first display information associated with the world time application may include information, such as the time of a country (or a city) in which the user is presently staying, and the time difference between the user's own country (or the user's residence city) and a country (or a city) in which the user is staying. Further, the application bar 601-1 may include an action icon 620 associated with a basic function of the world time application.

In response to a first gesture 631 for the application bar 601-1 in the user interface 605 illustrated in FIG. 6A, the electronic device 101 may display, as illustrated in FIG. 6B, the second-type application bar 601-2 in the upper region of the user interface 605 in place of the first-type application bar 601-1. Second display information 612 may be displayed in the second-type application bar 601-2. For example, application title information may be displayed as the second display information associated with the world time application.

In response to the second gesture 632 for the application bar 601-2 in the user interface 605 illustrated in FIG. 6B, the electronic device 101 may redisplay, as illustrated in FIG. 6A, the first-type application bar 601-1 in the upper region of the user interface 605 in place of the second-type application bar 601-2.

Figure 7A:
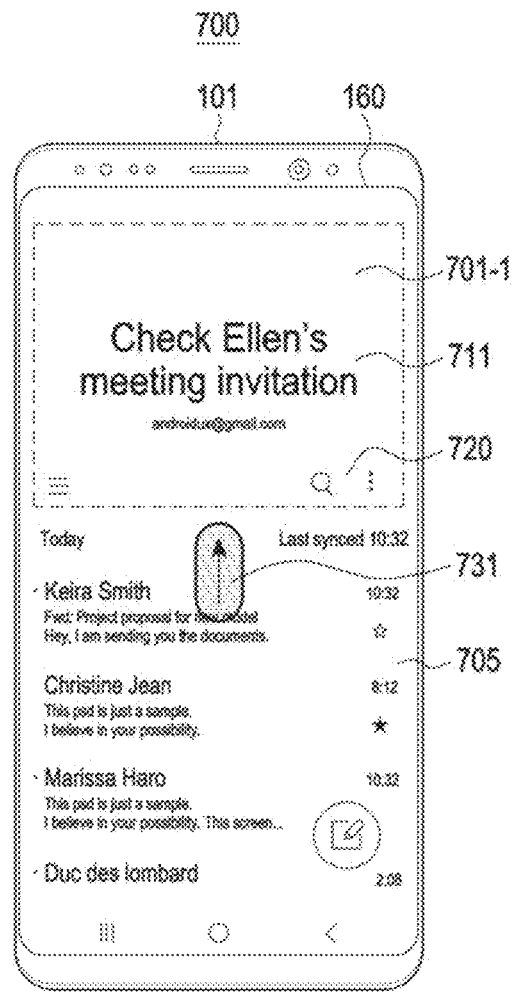
FIG. 7A illustrates an example for describing a user interface including an application bar according to certain embodiments.
Figure 7B:
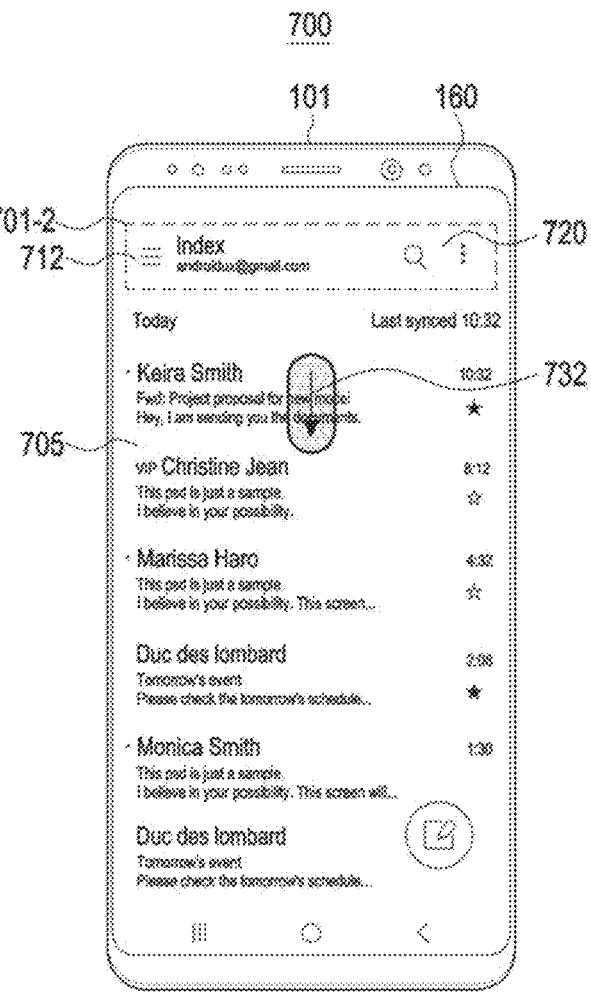
FIG. 7B illustrates an example for describing a user interface including an application bar according to certain embodiments.

FIG. 7A illustrates an example 700 for describing a user interface including an application bar according to certain embodiments, and FIG. 7B illustrates an example 700 for describing a user interface including an application bar according to certain embodiments.

Referring to FIGS. 7A and 7B, the electronic device 101 may display a user interface 705 of an application on the touchscreen 160, and an application bar 701-1 or 701-2 for representing an application may be included in the specific region of the user interface 705. FIGS. 7A and 7B illustrate the user interface 705 of an email application. FIG. 7A illustrates an example in which a first-type application bar 701-1 is displayed in the user interface 705 of the application, and FIG. 7B illustrates an example in which a second-type application bar 701-2 is displayed in the user interface 705 of the application.

When the display type of the user interface 705 of the email application is identified to be a first type, the electronic device 101 may acquire, as contextual information associated with the email application, information on a specific user configured by a user from the email application and may obtain whether to receive mail received in relation to the specific user. The electronic device 101 may identify mail received from the specific user configured by the user and may generate, as first display information, summary information which summarizes a text message in the identified mail.

As illustrated in FIG. 7A, the electronic device 101 may display the first-type application bar 701-1 in the upper region of the user interface 705 and may display, on the application bar 701-1, first display information 711 generated based on the contextual information associated with the email application. For example, the first display information associated with the email application may include summary information of a mail message related to a specific user preconfigured by the user. Further, the application bar 701-1 may include an action icon 720 associated with a basic function of the email application.

The electronic device 101 may identify whether a first gesture 731 for the application bar 701-1 is detected/received from the user interface 705 illustrated in FIG. 7A. For example, the first gesture 731 may include a touch drag or touch flick gesture scrolled toward the region of the application bar 701-1 in the user interface 705.

In response to the first gesture 731 for the first-type application bar 701-1, the electronic device 101 may display, as illustrated in FIG. 7B, the second-type application bar 701-2 in the upper region of the user interface 705 in place of the first-type application bar 701-1. Second display information 712 may be displayed in the second-type application bar 701-2. For example, as the second display information associated with the email application, an action bar (e.g. index search) related to a basic function of the application may be displayed.

The electronic device 101 may identify whether a second gesture 732 for the application bar 701-2 is detected/received from the user interface 705 illustrated in FIG. 7B. For example, the second gesture 732 may include a touch drag or touch flick gesture scrolled in the opposite direction to the region of the application bar 701-2 in the user interface 705.

In response to the second gesture 732 for the second-type application bar 701-2, the electronic device 101 may redisplay, as illustrated in FIG. 7A, the first-type application bar 701-1 in the upper region of the user interface 705 in place of the second-type application bar 701-2.

Figure 8A:
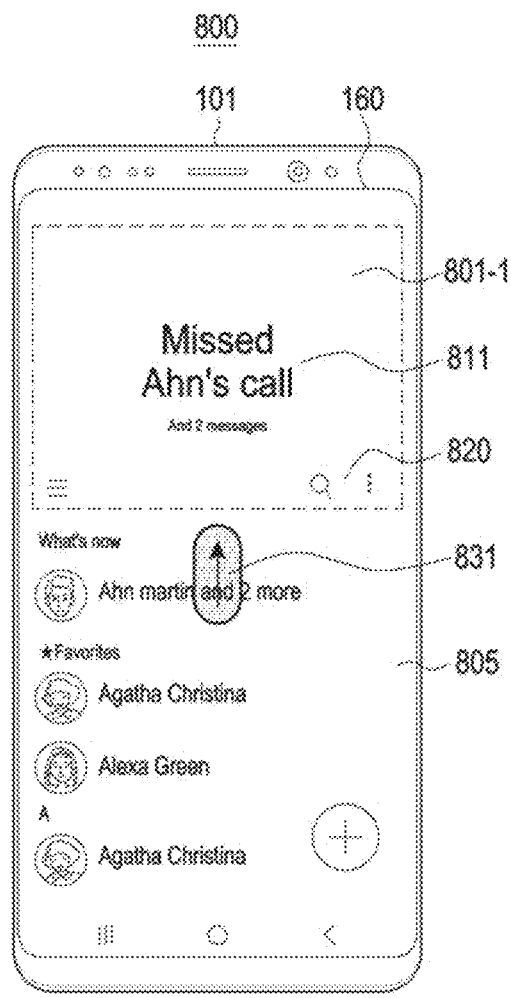
FIG. 8A illustrates an example for describing a user interface including an application bar according to certain embodiments.
Figure 8B:
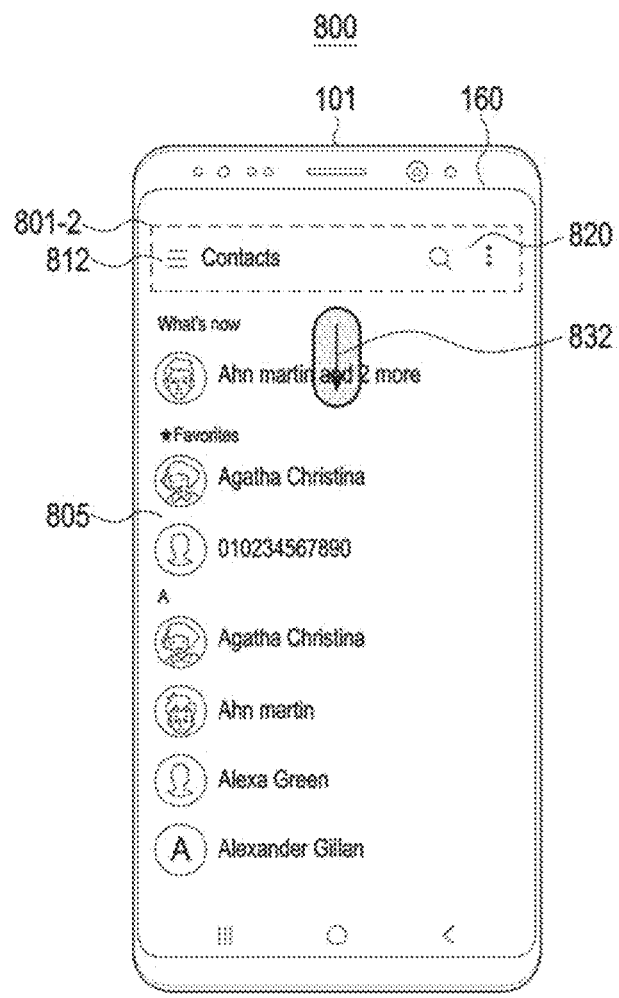
FIG. 8B illustrates an example for describing a user interface including an application bar according to certain embodiments.

FIG. 8A illustrates an example 800 for describing a user interface including an application bar according to certain embodiments, and FIG. 8B illustrates an example 800 for describing a user interface including an application bar according to certain embodiments.

Referring to FIGS. 8A and 8B, the electronic device 101 may display a user interface 805 of an application on the touchscreen 160, and an application bar 801-1 or 801-2 for representing an application may be included in the specific region of the user interface 805. FIGS. 8A and 8B illustrate the user interface 805 of a contacts application. FIG. 8A illustrates an example in which a first-type application bar 801-1 is displayed in the user interface 805 of the application, and FIG. 8B illustrates an example in which a second-type application bar 801-2 is displayed in the user interface 805 of the application.

When the display type of the user interface 805 of the contacts application is identified to be a first type, the electronic device 101 may acquire, as contextual information associated with the contacts application, information of a specific user preconfigured by a user from the contacts application, and may detect whether a phone call or a message (mail, SMS, MMS, chatting, etc.) was received in relation to the specific user. The electronic device 101 may identify information, such as whether the phone call or message is received from the specific user configured by the user and may generate, as first display information, summary information which summarizes the identified information relating to reception or non-reception thereof.

As illustrated in FIG. 8A, the electronic device 101 may display the first-type application bar 801-1 in the upper region of the user interface 805, and may display, on the application bar 801-1, first display information 811 generated based on the contextual information associated with the contacts application. For example, the first display information associated with the contacts application may include summary information which summarizes whether a phone call or mail message related to the specific user configured by the user is received. Further, the application bar 801-1 may include an action icon 820 associated with a basic function of the contacts application. The electronic device 101 may identify whether a first gesture 831 for the application bar 801-1 is detected/received from the user interface 805 illustrated in FIG. 8A. For example, the first gesture 831 may include a touch drag or touch flick gesture scrolled toward the region of the application bar 801-1 in the user interface 805.

In response to the first gesture 831 for the first-type application bar 801-1, the electronic device 101 may display, as illustrated in FIG. 8B, the second-type application bar 801-2 in the upper region of the user interface 805 in place of the first-type application bar 801-1. Second display information 812 may be displayed in the second-type application bar 801-2. For example, as the second display information associated with the contacts application, an action bar (e.g. contacts search) related to a basic function of the application may be displayed.

The electronic device 101 may identify whether a second gesture 832 for the application bar 801-2 is detected/received from the user interface 805 illustrated in FIG. 8B. For example, the second gesture 832 may include a touch drag or touch flick gesture scrolled in the opposite direction to the region of the application bar 801-2 in the user interface 805.

In response to the second gesture 832 for the second-type application bar 801-2, the electronic device 101 may redisplay, as illustrated in FIG. 8A, the first-type application bar 801-1 in the upper region of the user interface 805 in place of the second-type application bar 801-2.

Figures 9A, 9B:
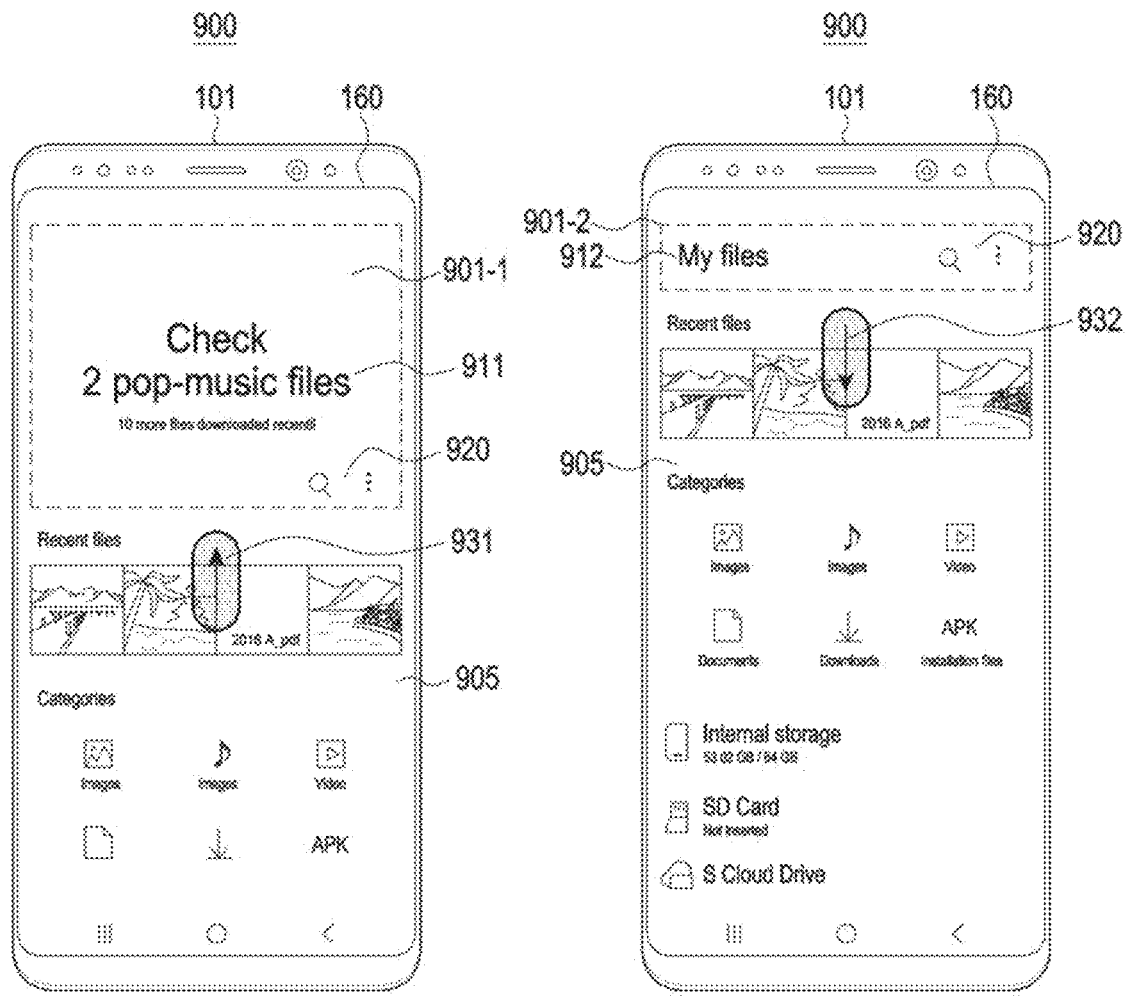
FIG. 9A illustrates an example for describing a user interface including an application bar according to certain embodiments.
FIG. 9B illustrates an example for describing a user interface including an application bar according to certain embodiments.

FIG. 9A illustrates an example 900 for describing a user interface including an application bar according to certain embodiments, and FIG. 9B illustrates an example 900 for describing a user interface including an application bar according to certain embodiments.

Referring to FIGS. 9A and 9B, the electronic device 101 may display a user interface 905 of an application on the touchscreen 160, and an application bar 901-1 or 901-2 for representing an application may be included in the specific region of the user interface 905. FIGS. 9A and 9B illustrate the user interface 905 of a file management application. FIG. 9A illustrates an example in which a first-type application bar 901-1 is displayed in the user interface 905 of the application, and FIG. 9B illustrates an example in which a second-type application bar 901-2 is displayed in the user interface 905 of the application.

When the display type of the user interface 905 of the file management application is identified to be a first type, the electronic device 101 may acquire, as contextual information associated with the file management application, file information that most recently updated by a user through the file management application from the file management application. The electronic device 101 may identify the obtained file information which was most recently updated and may generate, as first display information, summary information which summarizes the updates to the file information.

As illustrated in FIG. 9A, the electronic device 101 may display the first-type application bar 901-1 in the upper region of the user interface 905, and may display, on the application bar 901-1, first display information 911 generated based on the contextual information associated with the file management application. For example, the first display information associated with the file management application may include summary information which summarizes a file lastly updated by the user. Further, the application bar 901-1 may include an action icon 920 associated with a basic function of the file management application.

The electronic device 101 may identify whether a first gesture 931 for the application bar 901-1 is detected/received from the user interface 905 illustrated in FIG. 9A. For example, the first gesture 931 may include a touch drag or touch flick gesture scrolled toward the region of the application bar 901-1 in the user interface 905.

In response to the first gesture 931 for the first-type application bar 901-1, the electronic device 101 may display, as illustrated in FIG. 9B, the second-type application bar 901-2 in the upper region of the user interface 905 in place of the first-type application bar 901-1. Second display information 912 may be displayed in the second-type application bar 901-2. For example, as the second display information associated with the file management application, an action bar (e.g. file search) related to a basic function of the application may be displayed.

The electronic device 101 may identify whether a second gesture 932 for the application bar 901-2 is detected/received from the user interface 905 illustrated in FIG. 9B. For example, the second gesture 932 may include a touch drag or touch flick gesture scrolled in the opposite direction to the region of the application bar 901-2 in the user interface 905.

In response to the second gesture 932 for the second-type application bar 901-2, the electronic device 101 may redisplay, as illustrated in FIG. 9A, the first-type application bar 901-1 in the upper region of the user interface 905 in place of the second-type application bar 901-2.

Figure 10A:
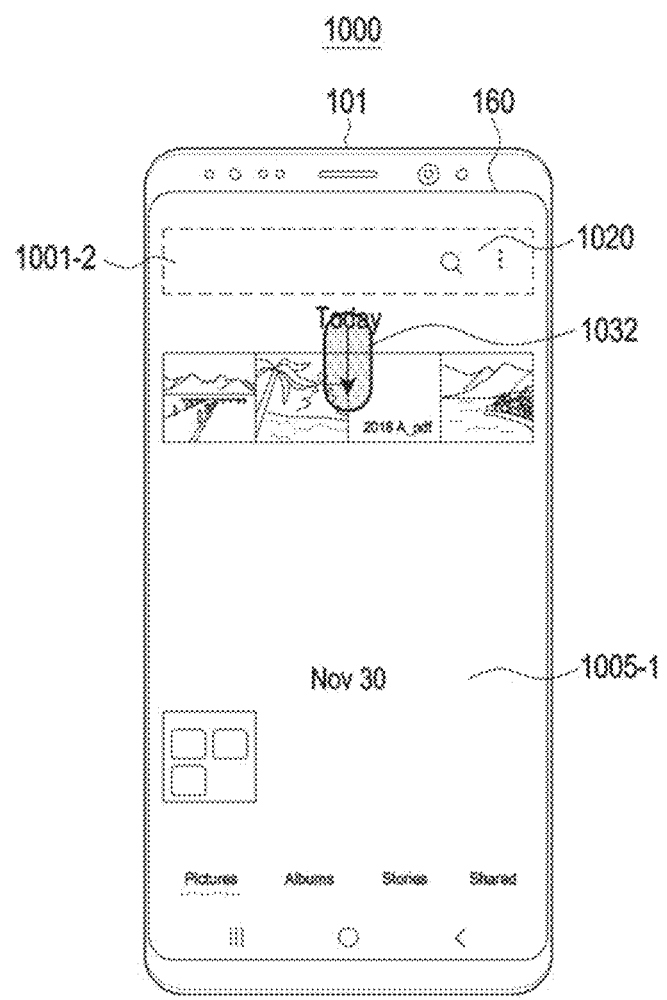
FIG. 10A illustrates an example for describing a user interface including an application bar according to certain embodiments.
Figure 10B:
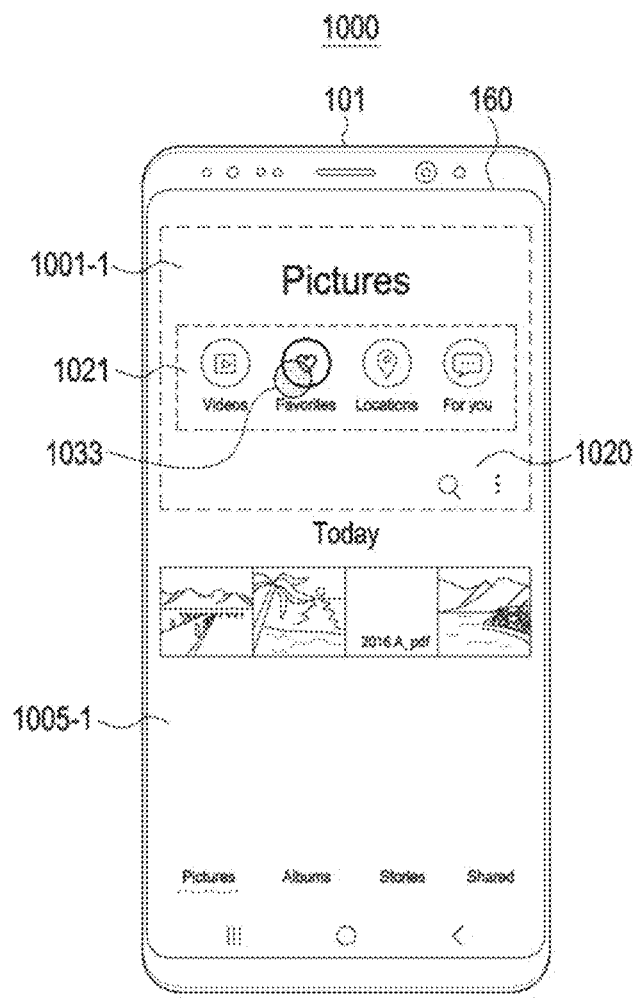
FIG. 10B illustrates an example for describing a user interface including an application bar according to certain embodiments.
Figure 10C:
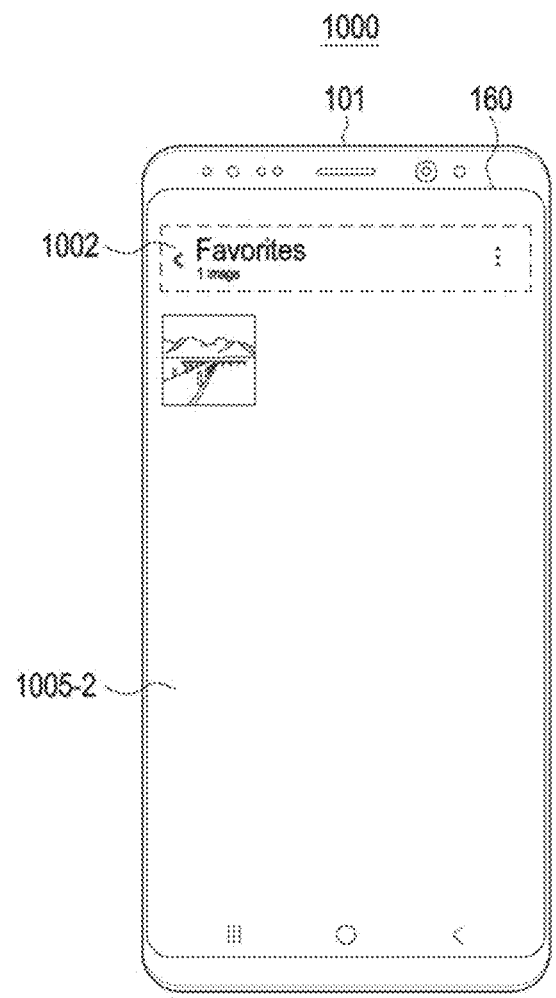
FIG. 10C illustrates an example for describing a user interface including an application bar according to certain embodiments.

FIG. 10A illustrates an example 1000 for describing a user interface including an application bar according to certain embodiments, FIG. 10B illustrates an example 1000 for describing a user interface including an application bar according to certain embodiments, and FIG. 10C illustrates an example 1000 for describing a user interface including an application bar according to certain embodiments.

Referring to FIGS. 10A, 10B, and 10C, the electronic device 101 may display a user interface 1005-1 or 1005-2 of an application on the touchscreen 160, and application bars 1001-1 or 1001-2 and 1002 for representing an application may be included in specific regions of the user interfaces 1005-1 and 1005-2, respectively. FIGS. 10A, 10B, and 10C illustrate the user interfaces 1005-1 and 1005-2 of a gallery application. FIG. 10A illustrates an example in which a second-type application bar 1001-2 is displayed in a first user interface 1005-1 of the application, FIG. 10B illustrates an example in which a first-type application bar 1001-1 is displayed in the first user interface 1005-1 of the application, and FIG. 10C illustrates an example in which a second-type application bar 1002 is displayed in a second user interface 1005-2 of the application.

When the display type of the first user interface 1005-1 of the gallery application is identified to be a second type, the electronic device 101 may display second display information associated with the gallery application. For example, as the second display information associated with the gallery application, an action bar (e.g. image search) related to a basic function of the application may be displayed.

As illustrated in FIG. 10A, the electronic device 101 may display the second-type application bar 1001-2 in the upper region of the first user interface 1005-1 and may display, on the application bar 1001-2, an action icon 1020 related to a basic function of the gallery application.

The electronic device 101 may identify whether a second gesture 1032 for the application bar 1001-2 is detected/received from the first user interface 1005-1 illustrated in FIG. 10A. For example, the second gesture 1032 may include a touch drag or touch flick gesture scrolled in the opposite direction to the region of the application bar 1001-2 in the first user interface 1005-1.

In response to the second gesture 1032 for the second-type application bar 1001-2, the electronic device 101 may display, as illustrated in FIG. 10B, the first-type application bar 1001-1 in the upper region of the first user interface 1005-1 in place of the second-type application bar 1001-2. Action icons 1021 associated with additional functions of the gallery application may be displayed in the first-type application bar 1001-1 illustrated in FIG. 10B.

The electronic device 101 may identify whether a user selection gesture 1033 for selecting one from among the additional action icons 1021 displayed in the first-type application bar 1001-1 of the first user interface 1005-1 illustrated in FIG. 10B is detected/received. For example, the user selection gesture 1033 may include a touch gesture touching a specific action icon (e.g. a favorite).

Figure 11:
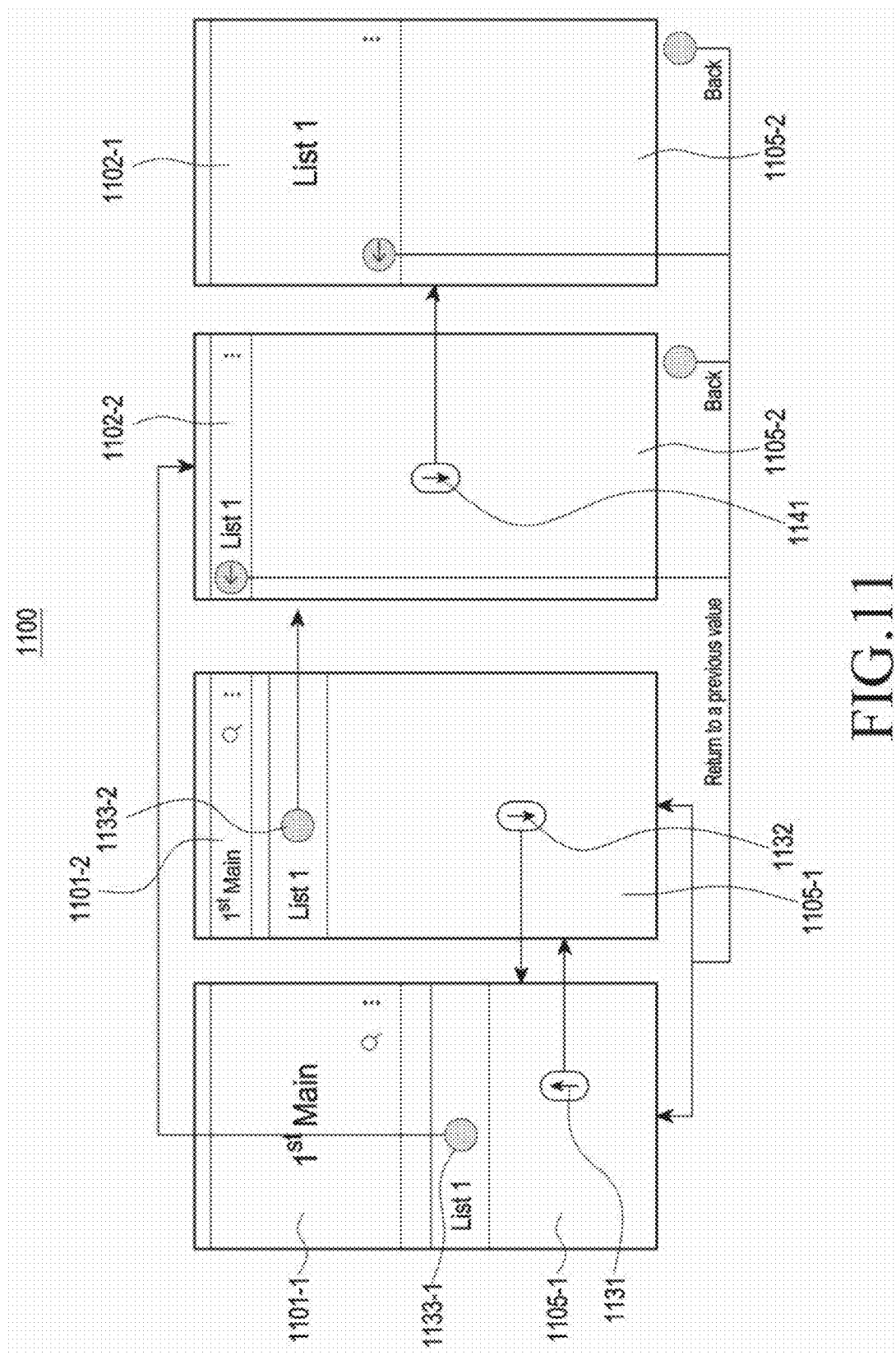
FIG. 11 illustrates an example for describing a user interface including an application bar according to certain embodiments.

In response to the user selection gesture 1033 for selecting a specific action icon from among the additional action icons 1021 included in the first-type application bar 1001-1, the electronic device 101 may display, as illustrated in FIG. 10C, the second user interface 1005-2, which provides a function related to the action icon selected by the user, in place of the first user interface 1005-1. The second-type application bar 1002 may be displayed in the upper region of the second user interface 1005-2 which has changed the first user interface 1005-1. For example, in the second user interface 1005-2 of the gallery application, title information related to a current operation (e.g. a favorite) of the gallery application may be displayed as the second display information. FIG. 11 illustrates an example 1100 for describing a user interface including an application bar according to certain embodiments.

Referring to FIG. 11, the electronic device 101 may display a main user interface 1105-1 of an application, and an application bar 1101-1 or 1101-2 for representing an application may be included in a specific region of the main user interface 1105-1.

The electronic device 101 may display a first-type application bar 1101-1 in the main user interface 1105-1. List information regarding functions of an executed application may be displayed in the main user interface 1105-1.

When a first gesture 1131 for the first-type application bar 1101-1 is identified in the main user interface 1105-1, the electronic device 101 may display a second-type application bar 1101-2 in place of the first-type application bar 1101-1 in response to the first gesture 1131. On the contrary, when a second gesture 1132 for the second-type application bar 1101-2 is identified, the electronic device 101 may display the first-type application bar 1101-1 in place of the second-type application bar 1101-2 in response to the second gesture 1132.

When a user selection gesture 1133-1 selecting the list information in the main user interface 1105-1 is identified, the electronic device 101 may display a sub user interface 1105-2 in place of the main user interface 1105-1 in response to the user selection gesture 1133-1. Further, when a backward action icon for requesting return to a previous value is selected in the sub user interface 1105-2, the electronic device 101 may display the previous main user interface 1105-1 in place of the sub user interface 1105-2.

The electronic device 101 may display a second-type application bar 1102-2 in the sub user interface 1105-2 in response to a selection gesture 1133-2. As in the main user interface 1105-1, when a second gesture 1141 for the second-type application bar 1102-2 displayed in the sub user interface 1105-2 is identified, the electronic device 101 may display a first-type application bar 1102-1 in place of the second-type application bar 1102-2 in response to the second gesture 1141.

An electronic device (e.g. the electronic device 101 in FIG. 1) according to certain embodiments includes: a touchscreen (e.g. the display device 160 in FIG. 1); at least one processor (e.g. the processor 120 in FIG. 1); and a memory (e.g. the memory 130 in FIG. 1), such that the memory may store instructions configured to enable, when executed, the at least one processor to: execute an application in response to a first input; identify a display type of an application bar associated with the application on the basis of the execution of the application; obtain contextual information associated with the application on the basis of the display type of the application bar being a first type; and display the application bar including first display information corresponding to the contextual information on the touchscreen on the basis of the contextual information.

In the electronic device 101 according to certain embodiments, the contextual information associated with the application may include at least one of application identification information, application configuration information, application state information, or application event information, obtained from the application, or electronic device system information obtained from a system of the electronic device.

In the electronic device 101 according to certain embodiments, the first display information may include at least one of notification information associated with configuration of the application, notification information associated with a state of the application, notification information associated with an event of the application, or an action icon associated with an additional function of the application.

In the electronic device 101 according to certain embodiments, the instructions may be configured to enable the at least one processor to: identify second display information configured before the execution of the application on the basis of the display type of the application bar being a second type; and display the application bar including the second display information on the touchscreen.

In the electronic device 101 according to certain embodiments, the first type of the application bar may include an enlarged region larger than a region of the second type of the application bar.

In the electronic device 101 according to certain embodiments, the second display information may include title information indicating the application or an operation of the application.

In the electronic device 101 according to certain embodiments, the instructions may be configured to enable the at least one processor to: generate the first display information on the basis of the contextual information; and display the generated first display information in the application bar.

In the electronic device 101 according to certain embodiments, the instructions may be configured to enable the at least one processor to generate the first display information on the basis of at least one of contextual information obtained from the application or contextual information obtained from the system of the electronic device.

In the electronic device 101 according to certain embodiments, the instructions may be configured to enable the at least one processor to enlarge or reduce a region of the application bar on the basis of the first display information corresponding to the contextual information.

In the electronic device 101 according to certain embodiments, the instructions may be configured to enable the at least one processor to: display the first-type application bar on the touchscreen; and reduce and display the region of the application bar in response to a first gesture for the first-type application bar displayed on the touchscreen.

In the electronic device 101 according to certain embodiments, the instructions may be configured to enable the at least one processor to change the first display information to the second display information configured before the execution of the application based on the region of the application bar being reduced.

In the electronic device 101 according to certain embodiments, the instructions may be configured to enable the at least one processor to: display a second-type application bar on the touchscreen; and enlarge and display the region of the application bar in response to a second gesture for the second-type application bar displayed on the touchscreen.

In the electronic device 101 according to certain embodiments, the instructions may be configured to enable the at least one processor to change the second display information configured before the execution of the application to the first display information based on the region of the application bar being enlarged.

An operation method of an electronic device (e.g. the electronic device 101 in FIG. 1) according to certain embodiments may include: executing an application in response to a first input; identifying a display type of an application bar associated with the application on the basis of the execution of the application; acquiring contextual information associated with the application on the basis of the display type of the application bar being a first type; and displaying the application bar including first display information corresponding to the contextual information on the touchscreen on the basis of the contextual information.

The operation method of the electronic device 101 according to certain embodiments may include: identifying second display information configured before the execution of the application on the basis of the display type of the application bar being a second type; and displaying the application bar including the second display information on the touchscreen.

The operation method of the electronic device 101 according to certain embodiments may include: displaying a first-type application bar on the touchscreen; and reducing and displaying a region of the application bar in response to a first gesture for the first-type application bar displayed on the touchscreen.

The operation method of the electronic device 101 according to certain embodiments may include replacing the first display information with the second display information configured before the execution of the application based on the region of the application bar being reduced.

The operation method of the electronic device 101 according to certain embodiments may include: displaying the second-type application bar on the touchscreen; and in response to a second gesture for the second-type application bar displayed on the touchscreen, enlarging and displaying the region of the application bar.

The operation method of the electronic device 101 according to certain embodiments may include replacing the second display information configured before the execution of the application with the first display information based on the region of the application bar being enlarged.

In a recording medium configured to store instructions according to certain embodiments, the instructions are configured to enable at least one circuit to perform at least one operation when the instructions are executed by the at least one circuit, such that the at least one operation may include: executing an application in response to a first input; identifying a display type of an application bar associated with the application on the basis of execution of the application; acquiring contextual information associated with the application on the basis of the display type of the application bar being a first type; and displaying the application bar including first display information corresponding to the contextual information on the touchscreen on the basis of the contextual information.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a touchscreen;
   at least one processor; and
   a memory,
   wherein the memory stores instructions executable by the at least one processor to cause the electronic device to:
   execute an application in response to receiving a first input;
   identify whether a display type of an application bar associated with the executed application is of a first type or a second type, wherein displaying the application bar as the first type includes displaying information included in an event associated with the application executable by the at least one processor, and displaying the application bar as the second type includes displaying a title of the application different from the information of the event, and wherein the event is stored in the memory and the information is displayable in as text;
   based on the display type of the application bar being the first type, retrieve the event of the application from the memory, including the text of the information of the event;
   after retrieving the event, display the application bar on the touchscreen by displaying first display information with the text of the event, based on the retrieved event; and
   based on detecting a touch input to the touchscreen separate from the displayed application bar, change the application bar from the first type to the second type by altering a size of the application bar contemporaneously with removing the first display information and the text of the event from display, and displaying second display information including the title of the application.

2. The electronic device of claim 1, wherein the information of the event includes at least one of an identifier for the application, a configuration of the application, a state of the application, and information for a system of the electronic device, and
   wherein the first type and the second type both include display of an icon selectable to create a new event for the application.

3. The electronic device of claim 1, wherein the first display information comprises a notification, the notification associated with at least one of a configuration of the application, a state of the application, an event of the application, or an action icon associated with an additional function of the application.

4. The electronic device of claim 1, wherein
   the second display information is configured prior to the execution of the application, and
   wherein the event includes pre-specified details of an event scheduled for a future time, and the text is indicative of the future time.

5. The electronic device of claim 4, wherein the application bar as displayed for the first type is larger than the application bar as displayed for the second type.

6. The electronic device of claim 1, wherein the first display information is generated based on the information.

7. The electronic device of claim 6, wherein the first display information is further generated based on at least one of contextual information obtained from the application, and contextual information obtained from a system in the electronic device.

8. The electronic device of claim 1, wherein the instructions are further executable by the at least one processor to cause the electronic device to: enlarge or reduce a region of the application bar based on the first display information corresponding to the information.

9. The electronic device of claim 1, wherein the instructions are executable by the at least one processor to cause the electronic device to:
   after displaying the application bar on the touchscreen, reduce a size of the application bar in response to receiving a first gesture to the application bar.

10. The electronic device of claim 9, wherein
    the second display information is configured prior to the execution of the application.

11. The electronic device of claim 10, wherein reducing the size of the application bar includes changing a configuration of the displayed application bar from the first type the second type, the instructions further executable by the at least one processor to cause the electronic device to:

in response to receiving a second gesture to the application bar of the second type, enlarge the application bar.

12. The electronic device of claim 11, wherein when the application bar is enlarged based on the received second gesture, the second display information is removed for redisplay of the first display information.

13. An operation method of an electronic device, comprising:

executing, by at least one processor, an application in response to a first input;

identifying whether a display type of an application bar associated with the application is of a first type or a second type, wherein displaying the application bar as the first type includes displaying information included in an event associated with the application executable by the at least one processor, and the displaying the application bar as the second type includes displaying a title of the application different from the information of the event, and wherein the event is stored in a memory and the information is displayable in as text;

based on the display type of the application bar being the first type, retrieving the event of the application from the memory, including the text of the event;

after retrieving the event, displaying the application bar on a touchscreen, by displaying first display information with the text of the event, based on the retrieved event; and based on detecting a touch input to the touchscreen separate from the displayed application bar, changing the application bar from the first type to the second type by altering a size of the application bar contemporaneously with removing the first display information and the text of the event from display, and displaying second display information including the title of the application.

14. The method of claim 13, wherein the second display information that is configured prior to the execution of the application, and wherein the event includes pre-specified details of an event scheduled for a future time, and the text is indicative of the future time.

15. The method of claim 13, further comprising:

after displaying the application bar on the touchscreen, reducing a size of the application bar in response to receiving a first gesture to the application bar.

16. The method of claim 15, further comprising:

based on the application bar being reduced in size in response to receiving the first gesture, changing the first display information to a second display information that is configured prior to the execution of the application.

17. The method of claim 16, wherein reducing the size of the application bar includes changing a configuration of the displayed application bar from the first type the second type, the method further comprising:

in response to receiving a second gesture to the application bar of the second type, enlarging the application bar.

18. The method of claim 17, wherein when the application bar is enlarged based on the received second gesture, the second display information is removed for redisplay of the first display information.

19. A non-transitory recording medium configured to store instructions, wherein the instructions are configured to enable at least one circuit to perform at least one operation when the instructions are executed by the at least one circuit, the at least one operation comprising:

executing, by at least one processor, an application in response to a first input;

identifying whether a display type of an application bar associated with the application is a of first type or a second type, wherein displaying the application bar as the first type includes displaying information included in an event associated with the application executable by the at least one processor, and displaying the application bar as the second type includes displaying a title of the application different from the event, and wherein the event is stored in a memory and the information is displayable in as text;

based on the display type of the application bar being the first type, retrieving the event of the application from the memory, including the text of the event;

after retrieving the event, displaying the application bar on a touchscreen, by displaying first display information with the text of the event, based on the retrieved event; and based on detecting a touch input on the touchscreen separate from the displayed application bar, changing the application bar from the first type to the second type by altering a size of the application bar contemporaneously with removing the first display information and the text of the event from display, and displaying second display information including the title of the application.

* * * * *